Feb. 10, 1925.
1,525,965
H. THOMAS
POWER DRIVEN SLICING MACHINE
Filed June 7, 1924  3 Sheets-Sheet 1
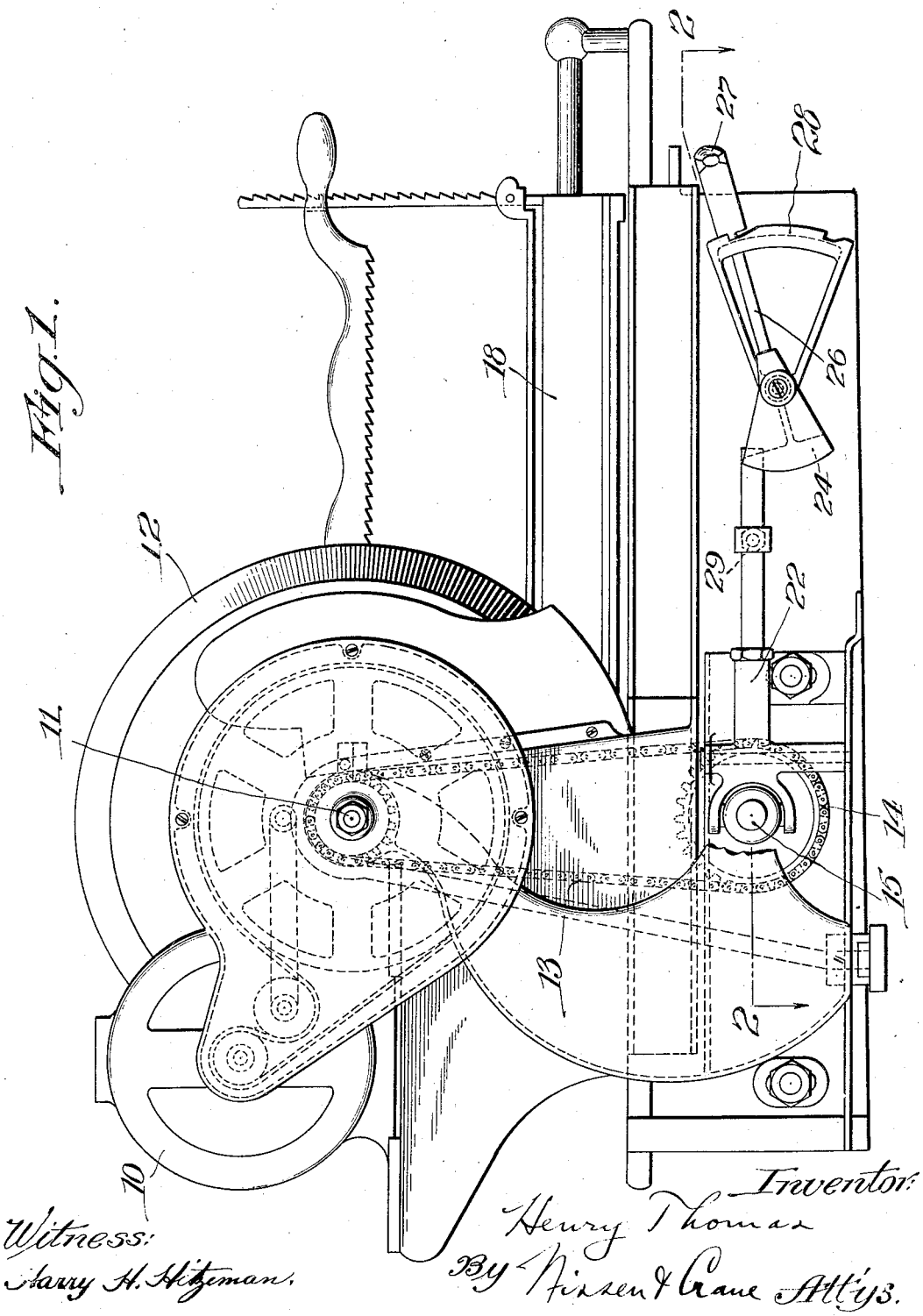

Feb. 10, 1925.
H. THOMAS
1,525,965
POWER DRIVEN SLICING MACHINE
Filed June 7, 1924  3 Sheets-Sheet 2
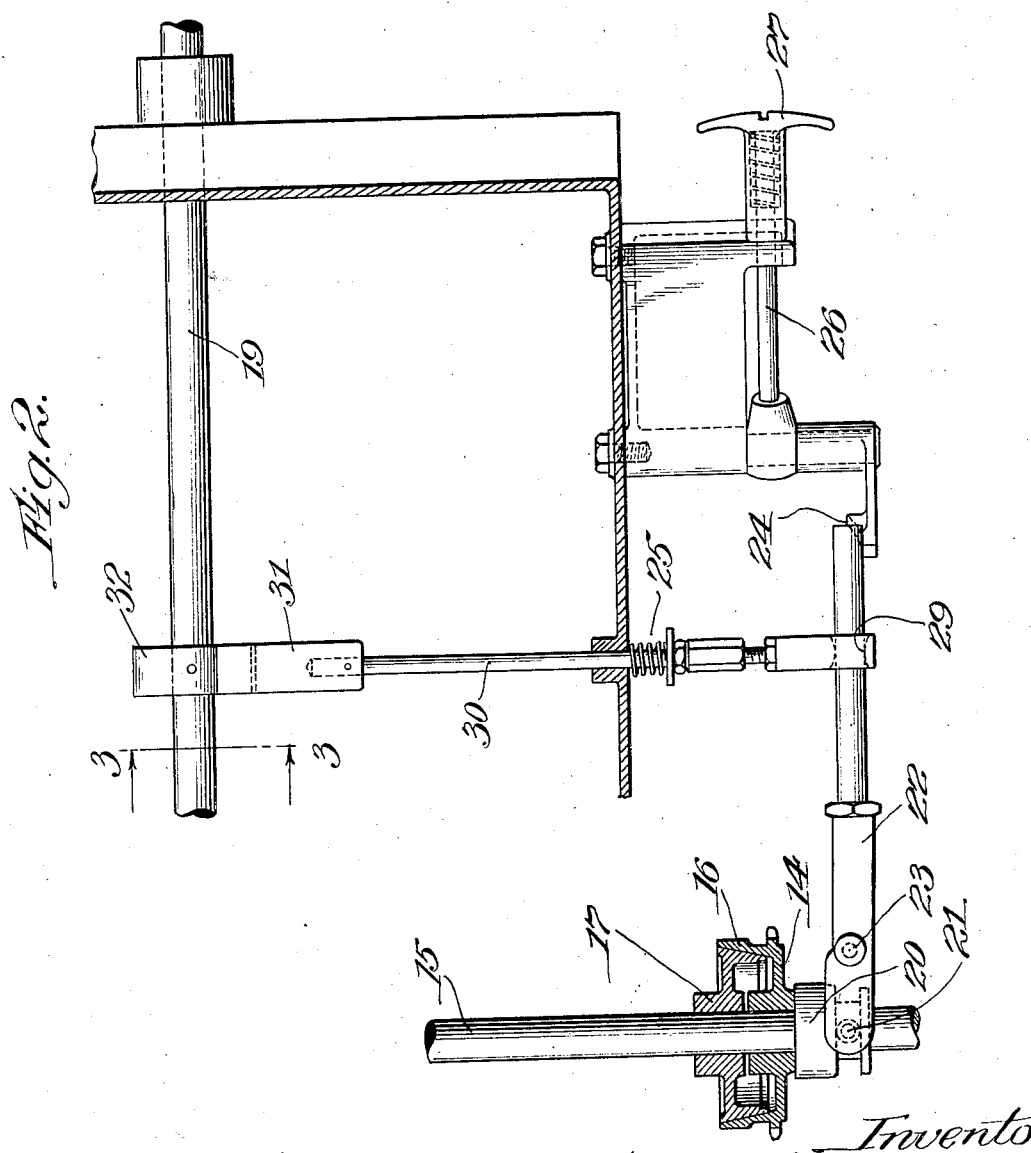

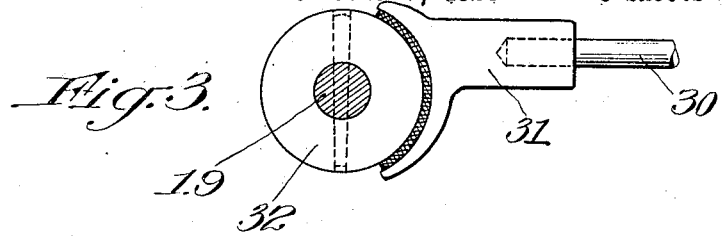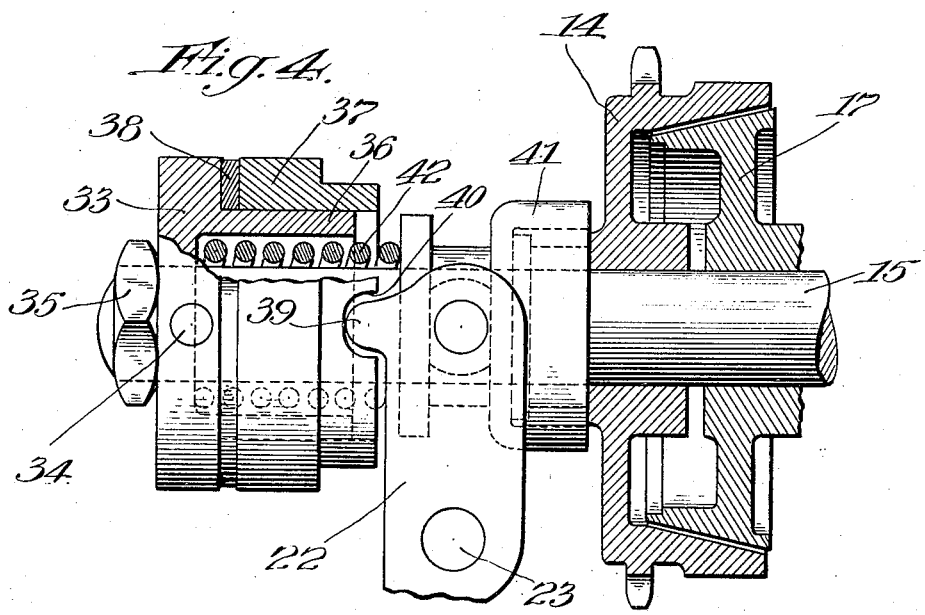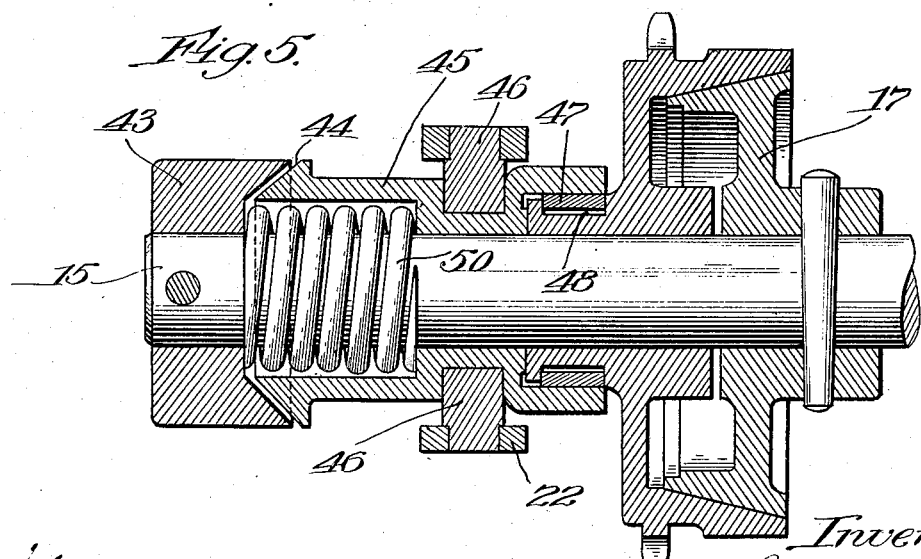

Patented Feb. 10, 1925.

1,525,965

UNITED STATES PATENT OFFICE.

HENRY THOMAS, OF EAST HAM, LONDON, ENGLAND, ASSIGNOR TO U. S. SLICING MACHINE COMPANY, OF LAPORTE, INDIANA, A CORPORATION OF INDIANA.

POWER-DRIVEN SLICING MACHINE.

Application filed June 7, 1924. Serial No. 718,442.

*To all whom it may concern:*

Be it known that I, HENRY THOMAS, a subject of the King of England, residing at East Ham, London, England, have invented certain new and useful Improvements in Power-Driven Slicing Machines, of which the following is a specification.

This invention relates to machines for slicing meat and other material, operated by a power motor, and has for its object the provision of a brake device by which the operation of the machine may be stopped at any definite position in its cycle of movement.

The invention is exemplified in the combination and arrangement of parts shown in the accompanying drawings and described in the following specification, and it is more particularly pointed out in the appended claims.

In the drawings—

Fig. 1 is an elevation of a slicing machine having one embodiment of the present invention applied thereto;

Fig. 2 is a horizontal section substantially on line 2—2 of Fig. 1;

Fig. 3 is a vertical section substantially on line 3—3 of Fig. 2;

Fig. 4 is a longitudinal section of a modified form of the clutch and brake mechanism; and Fig. 5 is a view similar to Fig. 4 showing a different modification.

The machine shown in Fig. 1 is a power driven slicing machine similar to that shown in application of W. A. van Berkel, Serial No. 605,549. The machine, as there explained, is provided with a motor 10 which operates the spindle 11 having a slicing knife 12 mounted thereon. A sprocket chain 13 connects the spindle with a sprocket wheel 14 on the shaft 15 journaled in the base of the machine. The sprocket wheel 14 is freely journaled on the shaft 15 and is provided with a clutch flange 16 for engaging a clutch member 17 rigidly fixed to the shaft 15. The shaft 15 drives the mechanism for operating the table 18 and is provided with gearing for operatively connecting it with the shaft 19.

The sprocket wheel 14 is provided with a clutch collar 20 engaged by pins 21 on a lever 22, the lever being pivotally mounted at 23 on the base of the machine frame. A cam 24 engages the long arm of the lever 22 for forcing the lever inwardly toward the frame of the machine and thus releasing the clutch members 16 and 17 from one another. A spring 25 normally holds the clutch members in operative relation. A hand lever 26 is provided for operating the cam 24, the lever having a spring catch 27 for engaging notches in a segment 28 to hold the lever 26 in its downward position with the clutch members 16 and 17 disengaged. The lever 22 passes through a loop 29 in a slide rod 30 and the rod 30 carries a brake shoe 31 at its inner end for engaging a brake wheel 32 on the shaft 19, as shown more clearly in Fig. 3.

It will be seen that when the clutch members 16 and 17 are in engagement for driving the sliding table 18 the brake 31 will be released by the spring 25, but when the lever 26 is depressed to disengage the clutch members 16 and 17 the brake 31 will be immediately set so that the table 18 will be arrested and held from further movement under the influence of its momentum. It is found that in practice in the absence of a positive arresting means the momentum of the table will cause further operation usually sufficient to partially sever a slice after the clutch has been disconnected. It is, of course, desirable to be able to check the movement of the table at the exact point of operation in which it is positioned at the time that the power is thrown off and this result is secured by the present invention.

In the modified form of the invention shown in Fig. 4 the braking mechanism is attached to the shaft 15 instead of shaft 19, as indicated in the form previously described. In this modified form a brake member 33 is secured to the shaft 15 by a pin 34 and nut 35. The member 33 is provided with a sleeve 36 on which a brake disc 37 is slidably and rotatably mounted. A friction member 38 may be interposed between the braking members 33 and 37.

The lever 22 is provided with a pair of projections 39 which engage notches 40 in the brake sleeve 36. A collar 41 is loosely journaled on the shaft 15 and engages the sprocket wheel 14 which cooperates with the clutch member 17 in the manner previously described. A spring 42 is interposed between the brake member 33 and the collar 41 and normally presses the short end of the lever toward the clutch 17 and thus holds the clutch and sprocket wheel in operative engagement with one another. When the lever 22 is moved in the opposite direction against the tension of the spring 42 the projections 39 force the brake member 37 against the brake member 33 and thus stops rotation of the shaft. The brake member 37 is held against rotation by the projections 39 on the lever 22.

In the form shown in Fig. 5 a brake collar 43 is secured to the shaft 15 and cooperates with a braking surface 44 on a collar 45 rotatably mounted on the shaft 15 but held against rotation by projections 46 on the lever 22. The sleeve 45 has a ring 47 fixed thereto and engaging a groove 48 in the sprocket wheel 14 so as to permit relative rotation between the sprocket wheel and sleeve. A spring 50 normally urges the sleeve 45 to the right, as viewed in Fig. 5. Under the influence of the spring the sprocket wheel 14 and clutch member 17 are normally held in operative engagement to drive the shaft 15. Movement of the lever 22 will disengage the sprocket wheel from the clutch member 17 and engage the brake surface 44 with the collar 43, thus checking the movement of the shaft 15 substantially simultaneously with the release of the clutch.

I claim:

1. The combination with a slicing machine having a reciprocating table, of a motor for operating said table, a clutch for releasably connecting said motor and table, and braking mechanism for checking the movement of said table when said clutch is released.

2. The combination with a slicing machine having a rotary knife, of a reciprocating table, a motor for driving said knife and table, a clutch for connecting said motor with said table, a brake for checking movement of said table, and a common operating means for said brake and clutch.

3. The combination with a slicing machine. of a rotary knife, a reciprocating table, a motor for driving said knife and table, a clutch interposed between said knife and table for disconnecting said table from said motor while said knife continues its operative connection with said motor, and a brake for arresting the movement of said table when said clutch is disconnected.

4. The combination with a slicing machine having a rotary knife and a reciprocating table, of a motor for operating said knife and table, a clutch for connecting said motor with said table, a spring normally holding said clutch in operative position, a lever for releasing said clutch, and brake mechanism actuated by said lever for arresting the movement of said table upon release of said clutch.

5. The combination with a slicing machine having a rotary knife and a reciprocating table, of a motor for driving said slicing machine, a shaft operated by said motor, a clutch for connecting said motor to drive said table, and brake mechanism for controlling the movement of said shaft to arrest said table when said clutch is released.

6. The combination with a slicing machine having a rotary knife, of a reciprocating table, a motor for driving said knife, a clutch interposed between said knife and table, a brake for arresting the movement of said table, a lever for releasing said clutch to permit operation of said knife independently of said table, and means actuated by said lever for operating said brake to arrest said table upon release of said clutch.

7. The combination with a slicing machine having a rotary knife, of a spindle for driving said knife, a motor for rotating said spindle, a reciprocating table, a shaft operatively connected with said table, means for driving said shaft from said spindle, a clutch for connecting said spindle and shaft, a spring for normally holding said clutch in operative engagement, a lever for releasing said clutch, a brake for arresting the movement of said table, means actuated by said lever for operating said brake when said clutch is released, and means for holding said clutch out of operative engagement and said brake in operative engagement.

In testimony whereof, I, HENRY THOMAS, have signed my name to this specification on this 29th day of April, 1924.

HENRY THOMAS.